Figure 1:
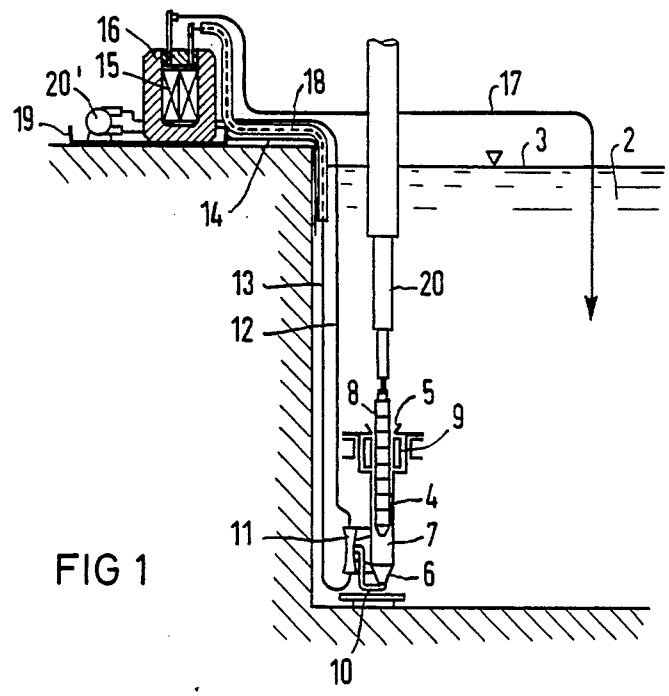

United States Patent [19]

Musiol et al.

[11] Patent Number: 4,847,042
[45] Date of Patent: Jul. 11, 1989

[54] APPARATUS FOR STORING NUCLEAR REACTOR FUEL ASSEMBLIES IN A WATER PIT

[75] Inventors: Werner Musiol; Klaus Knecht; Norbert Henzel, all of Erlangen, Fed. Rep. of Germany

[73] Assignee: Siemens Aktiengesellschaft, Berlin and Munich, Fed. Rep. of Germany

[21] Appl. No.: 528,109

[22] Filed: Aug. 31, 1983

[30] Foreign Application Priority Data

Sep. 1, 1982 [DE] Fed. Rep. of Germany ....... 3232539

[51] Int. Cl.⁴ .................. G21C 19/34; G21C 19/44; G21F 9/28
[52] U.S. Cl. .................................. 376/316; 376/272; 376/313
[58] Field of Search ............... 376/261, 272, 308, 309, 376/310, 313, 316

[56] References Cited

U.S. PATENT DOCUMENTS

| 3,007,814 | 11/1961 | Bulat | 376/309 |
| 4,071,376 | 1/1978 | McNeer | 134/1 |
| 4,436,694 | 3/1984 | Vassalotti et al. | 376/310 |
| 4,461,650 | 7/1984 | Ozawa | 376/310 |
| 4,470,952 | 9/1984 | Vassalotti | 376/309 |
| 4,483,205 | 11/1984 | Bellaiche et al. | 376/310 |

FOREIGN PATENT DOCUMENTS

| 2743453 | 3/1979 | Fed. Rep. of Germany . |
| 2758670 | 7/1979 | Fed. Rep. of Germany . |
| 2946004 | 5/1981 | Fed. Rep. of Germany . |

OTHER PUBLICATIONS

Rod, "Recent Advances in Ultrasonic Decontamination", Nucleonics, Jul. 1958, pp. 104–105.

Primary Examiner—Deborah L. Kyle
Assistant Examiner—Richard W. Wendtland
Attorney, Agent, or Firm—Herbert L. Lerner; Laurence A. Greenberg

[57] ABSTRACT

An apparatus for storing nuclear reactor fuel assemblies in a water pit, includes means for holding an end of a fuel assembly and for transporting the fuel assembly through the water pit, a vessel disposed in the water pit having a closed bottom and an open top in communication with a water space in the water pit forming a vertically elongated well in the vessel for at least partly receiving a fuel assembly, a suction connection in communicaton with the well through the closed bottom of the vessel, a suction pump connected to the suction connection, a shielding container, and a filter disposed in the shielding container and connected to the pump for collecting deposits suctioned from the well.

2 Claims, 1 Drawing Sheet

APPARATUS FOR STORING NUCLEAR REACTOR FUEL ASSEMBLIES IN A WATER PIT

The invention relates to an apparatus for storing nuclear reactor fuel assemblies in a water pit, with a device for holding one end of a nuclear reactor fuel assembly and for transporting the nuclear reactor fuel assembly in the water pit.

It is customary to associate such an apparatus and water pit with the nuclear reactor of a nuclear power station. In this water pit, nuclear reactor fuel assemblies which have been irradiated and discharged from the nuclear reactor can be inspected and stored until they are finally re-inserted into the nuclear reactor or transported off for re-processing. These nuclear reactor fuel assemblies are substantially formed of a fuel assembly frame holding the fuel rods containing the nuclear fuel proper. These fuel rods have a metal cladding tube which is hermetically sealed at both ends and which contains the nuclear fuel, such as $UO_2$ in pellet form.

It has been found that during the insertion into the nuclear reactor, deposits are frequently formed on the surface of the fuel assembly frame and the cladding tubes of the fuel rods. The deposits are radioactive and can impede the heat transfer from the nuclear fuel in the cladding tubes of the fuel rods to the working medium in the nuclear reactor. This is particularly true for the deposits on the surface of the cladding tubes. These deposits, however, can also drop off the nuclear reactor fuel assemby in an uncontrolled manner and can contaminate the water pit or the transport container.

It is accordingly an object of the invention to provide an apparatus for storing nuclear reactor fuel assemblies in a water pit, which overcomes the hereinafore-mentioned disadvantages of the heretofore-known devices of this general type, and which removes these deposits on the surface of the fuel assembly and frame and the cladding tubes of the fuel rods in a sufficiently short time so that they cannot be carried off in an uncontrolled manner.

With the foregoing and other objects in view there is provided, in accordance with the invention, an apparatus for storing nuclear reactor fuel assemblies in a water pit, comprising means for holding an end of a fuel assembly and for transporting the fuel assembly through the water pit, a vessel disposed in the water pit having a closed bottom and an open top in communication with a water space in the water pit forming a vertically elongated well or shaft in the vessel for at least partly receiving a fuel assembly, a suction connection in communication with or leading into the well through the closed bottom of the vessel, a suction pump connected to the suction connection, a shielding container, and a filter disposed in the shielding container and connected to the pump for collecting deposits suctioned from the well.

In accordance with another feature of the invention, there is provided an ultrasonic oscillator disposed in vicinity of the top of the vessel for radiating into the well.

In accordance with a concomitant feature of the invention, there are provided nozzles disposed in vicinity of the top of the vessel for spraying water aimed into the well.

Through the use of the invention, an irradiated nuclear reactor fuel assembly discharged from a nuclear reactor can be vertically introduced into the elongated well and pulled out again from the well by the holding device. In the process, the nuclear reactor fuel assembly passes the ultrasonic oscillator and/or the spray nozzles which are disposed at the top of the well, in the lengthwise direction. By means of the ultrasound emitted by the ultrasonic oscillator, particularly firmly adhering deposits are removed from the surface of the nuclear reactor fuel assembly, while by means of the water sprayed by the spraying nozzles onto the surface of the nuclear reactor fuel assembly, particularly loosely adhering deposits are sprayed off the surface of the nuclear reactor fuel assembly. The deposits collect at the bottom of the well, are suctioned off from there by means of the suction pump and are finally filtered in the filter located in the shielding chamber. In this manner, uncontrolled spreading of these radioactive deposits, in the water pit or later on in a transport container for the nuclear reactor fuel assembly, is prevented.

Other features which are considered as characteristic for the invention are set forth in the appended claims.

Although the invention is illustrated and described herein as embodied in an apparatus for storing nuclear reactor fuel assemblies in a water pit, it is nevertheless not intended to be limited to the details shown, since various modifications and structural changes may be made therein without departing from the spirit of the invention and within the scope and range of equivalents of the claims.

Figure 2:
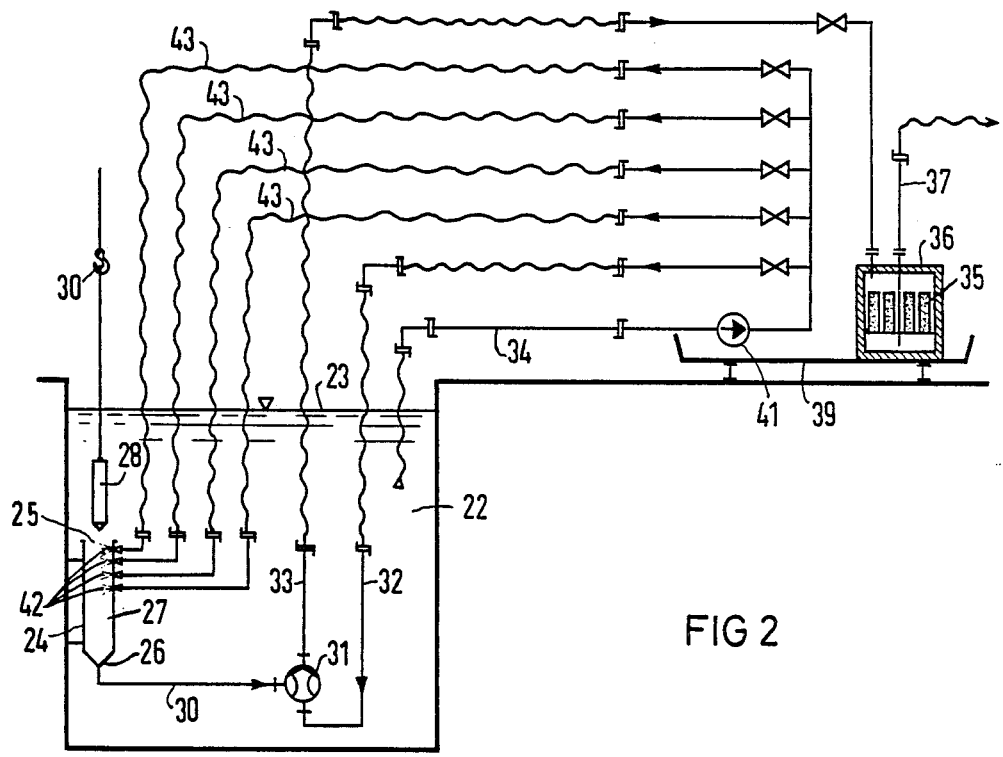

The constuction and method of operation of the invention, however, together with additional objects and advantages thereof will be best understood from the following description of specific embodiments when read in connection with the accompanying drawings, in which:

FIG. 1 is a fragmentary, highly diagrammatic, longitudinal sectional view through a water pit according to the invention with an ultrasonic oscillator for removing deposits on the surface of a nuclear reactor fuel assembly; and FIG. 2 is a likewise highly diagrammatic longitudinal sectional view through a water pit according to the invention with water nozzles for removing such deposits.

Referring now to the figures of the drawing in detail and first particularly to FIG. 1 thereof, there is seen a water pit 2 filled with water to a water level 3. A hollow metal cylinder or vessel 4 with a vertical longitudinal axis is disposed at the bottom of this water pit 2, i.e. below the water level 3. The hollow cylinder 4 has an opening 5 at the top thereof, i.e. it is open at the top and closed at the bottom 6. In this manner, the interior of the hollow cylinder 4 forms a well 7 for introducing an elongated nuclear reactor fuel assembly 8.

At the upper end of the cylinder 4, i.e. in vicinity of the opening 5, the hollow cylinder 4 has an ultrasonic oscillator 9 which emits ultrasound into the well 7. At the bottom of the hollow cylinder 4, a suction connection 10 opens into the well 7. This suction connection 10 is brought to a water-jet pump 11 which is likewise under water and is connected through a line 12 to a water pump 20'. The water pump 20' draws water from the water pit 2 through a pipeline 14 which leads into the water pit 2 and the pump continuously pushes the water to the water-jet pump 11 through the line 12. Water from this water-jet pump 11 is charged with the deposits suctioned from the bottom of the well 7 and is conducted through a line 13 and a filter 15 which is located in a shielding chamber 16. The deposits are filtered off in the filter 15, while the water returns through a pipeline 17 and a non-illustrated water pit purification system into the water pit 2. The shielding chamber 16 shields the environment against the radioactive radiation which emanates from the deposits collected in the filter 15. The line 13 is also brought through a shielding tube 18 at the edge of the pit, for the purpose of shielding the environment from the radioactive radiation emanating from the deposits. The water pump 20' and the shielding chamber 16 are mounted in a tray 19 for safety reasons. The shielding chamber 16 is capable of being ultimately conditioned and can be taken to ultimate storage after the filter 15 is completely filled with radioactive deposits.

The irradiated nuclear reactor fuel assembly 8 discharged from a nuclear reactor, is vertically suspended by one end from a mast 20 of a loading machine associated with a nuclear reactor. The fuel assembly is vertically introduced into the well 7 and subsequently pulled out again from the well 7 with the mast 20. In the process, the nuclear reactor fuel assembly 8 passes the ultrasonic oscillator 9 which is attached at the opening 5 in the top of the well 7. The ultrasound emanating from this ultrasonic oscillator 9 frees the surface of the nuclear reactor fuel assembly 8 and particularly also frees the outer surface of the cladding tubes of the fuel rods of this nuclear reactor fuel assembly 8, of deposits adhering thereto. Since the opening 5 of the well is in communication with the water space of the pit 2, water is continuously suctioned off at the bottom 6 of the well 7 by the waterjet pump 11 and deposits removed from the fuel assembly 8 are taken along immediately by the suctioned-off water.

After the nuclear reactor fuel assembly is pulled out of the well, the nuclear reactor fuel assembly 8 can be deposited under water in the water pit 2 and stored there, by means of the mast 20 of the loading machine.

The water pit 22 shown in FIG. 2 is filled with water to a water level 23. A hollow metal cylinder 24 with a vertical longitudinal axis is attached to a side wall of the water pit 22 in the water space of the water pit 22, i.e. below the water level 23. The cylinder 24 is closed at the bottom 26 and open at the top, i.e. an opening 25 is formed therein. This hollow cylinder or vessel 24 therefore forms a vertical shaft 27 communicating through the opening 25 with the water space of the water pit 22, for introducing a nuclear reactor fuel assembly 28 which is suspended at one end thereof from a hook 30 of a loading machine. A suction connection 30 opens into the shaft 27 at the bottom 26 of the hollow cylinder 24. This suction connection 30 is brought to a water-jet pump 31 which is connected by a line 32 to a centrifugal pump 41 mounted at the edge of the pit. A further line 33 connects the water-jet pump 31 to a filter 35 which is located outside the edge of the pit in a shielding chamber 36. For safety reasons, the centrifugal pump 41 as well as the shielding chamber 36 are mounted in a tray 39. A suction pipe 34 leading into the water space of the water pit 2 is connected to the centrifugal pump 41. Besides the water-jet pump 31, spraying nozzles 42 are further connected through hose lines 43 to the centrifugal pump 41. These spraying nozzles 42 are located at the top of the hollow cylinder 24 in vicinity of the opening 25 of the shaft 27, and are aimed into the shaft 27.

The centifugal pump 41 draws water through the pipeline 34 from the water pit 22 and pushes it through the line 32 as well as through the water-jet pump 31 and the hose lines 43 into the shaft 27 through the spray nozzles 42. The fuel assembly 28 passes the spray nozzles 42 in the lengthwise direction when it is introduced into the shaft 27 and when it is pulled out of this shaft 27, so that the water aimed toward the fuel assembly 28 from these spraying nozzles 42 rinses off particularly loosely adhering deposits from the surface of the nuclear reactor fuel assembly 28, i.e. particularly from the outer surface of the cladding tubes of the fuel rods. These flushed-off deposits are suctioned off immediately by the water-jet pump 31 and are taken along through the line 33 to the filter 35 by the water passing through the water-jet pump 31. The deposits are filtered out in the filter 35, while the filtered water is conducted through a pipeline 37 into a non-illustrated water pit purification system, and is conducted from there back into the water pit 22.

It is advantageous to move the spraying nozzles 42 back and forth. This achieves the result that the water jets issuing from the spraying nozzles 42 enter between the outer fuel rods of the nuclear reactor fuel assembly 28 and become effective at the inner fuel rods. An ultrasonic oscillator shown in FIG. 1 can also be used in the embodiment of FIG. 2 along with the nozzles 42.

As in the water pit according to FIG. 1, the shielding chamber 36 of the water pit according to FIG. 2 can also be taken to ultimate storage together with the filter 35, after the filter 35 is completely filled with radioactive deposits.

The foregoing is a description corresponding in substance to German application P No. 32 32 539.8, filed Sept. 1, 1982, the Interational priority of which is being claimed for the instant application, and which is hereby made part of this application. Any material discrepancies between the foregoing specification and the aforementioned corresponding German application are to be resolved in favor of the latter.

We claim:

1. Apparatus for storing nuclear reactor fuel assemblies in a water pit, comprising means for holding an end of a fuel assembly and for transporting the fuel assembly through the water pit, a vessel disposed in the water pit having a closed bottom and an open top in communication with water in a water space in the water pit forming a vertically elongated well in said vessel for at least partly receiving a fuel assembly, nozzles disposed in vicinity of said top of said vessel for spraying water into said well and causing deposits from the fuel assembly to fall into said well, a suction connection in commnication with said well through said closed bottom of said vessel, a suction pump connected to said suction connection, a shielding container, and a filter disposed in said shielding container and connected to said pump for collecting deposits suctioned from said well by said suction pump.

2. Apparatus according to claim 1, including an ultrasonic oscillator disposed in vicinity on said top of said vessel for radiating into said well and causing deposits from the fuel assembly to fall into said well.

* * * * *